(No Model.)

W. H. LANDER.
HAY OR GRAIN FORK.

No. 396,881. Patented Jan. 29, 1889.

WITNESSES:
Fred G. Dieterich
Edw. W. Byrn

INVENTOR,
W. H. Lander
BY Munn & Co
ATTORNEY.

UNITED STATES PATENT OFFICE.

WILLIAM H. LANDER, OF PENDLETON, OREGON.

HAY OR GRAIN FORK.

SPECIFICATION forming part of Letters Patent No. 396,881, dated January 29, 1889.

Application filed June 15, 1888. Serial No. 277,257. (No model.)

*To all whom it may concern:*

Be it known that I, WILLIAM H. LANDER, of Pendleton, in the county of Umatilla and State of Oregon, have invented a new and useful Improvement in Hay or Grain Forks, of which the following is a specification.

The object of my invention is to provide a simple and effective fork for loading hay or grain upon a stack, wagon, or into the upper story of a barn by means of a derrick, the hay being seized by the fork, which is then elevated and transported horizontally upon a rope track to the desired point, then dumped and returned to the point of loading again.

It consists in the peculiar construction and arrangement of the fork and its supporting and tripping devices, which I will now proceed to describe.

Figure 2:
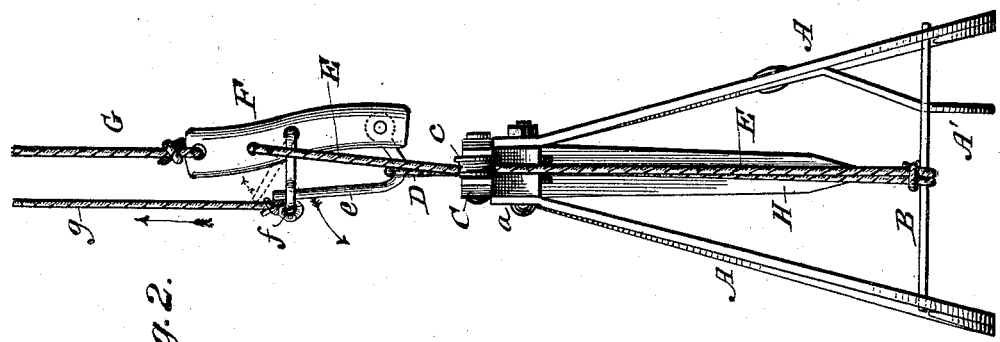
Figure 1:
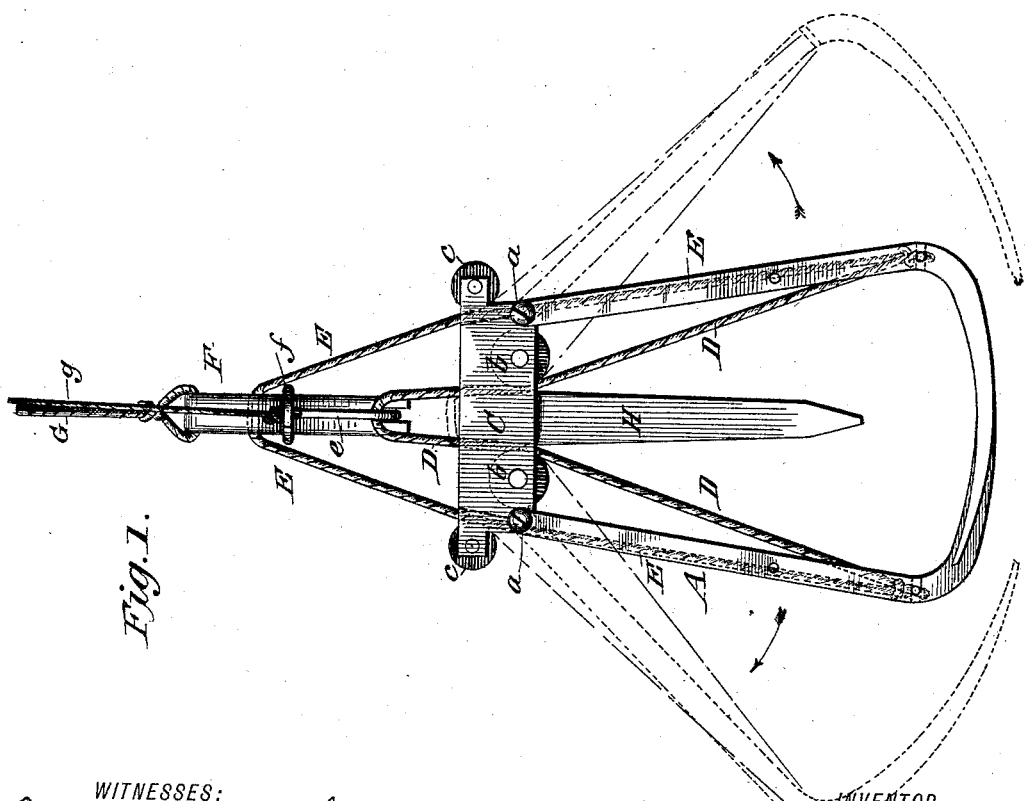

Figure 1 is a side elevation showing in dotted lines the tripped position of the fork, and Fig. 2 is an end elevation of the same in full lines.

A A are two pairs of clutch-hooks, whose lower pointed ends are bent inwardly toward each other. The two tines of each hook are connected together by cross bars or braces B, and the upper ends of the clutch-hooks are loosely hung upon a pivot-bolt, $a$, in a cross-head, C. From the cross-bars B of the hooks there is an inner rope, D, which passes about pulleys $b\ b$ in the cross-head and forms a loop above the cross-head that is designed to be held by the tripping device. From these cross-bars B another rope, E, extends to and about other pulleys, $c\ c$, on the outer ends of the cross-head C, and this rope extends through the trip-block F. The trip-block F is supported by a rope, G, which is designed to be attached in the usual way to a traveling carriage which runs upon a rope track.

H is a prong which is attached to the center of the cross-head and extends downwardly.

To the lower end of the trip-block is pivoted a hook-shaped catch, $e$, which is hooked into the loop of the inner rope, and just above this there is pivoted to the trip-block a ring-shaped trigger, $f$, which is adapted to drop over the end of the catch $e$ when it is turned up. From this trigger-ring there extends a trip-rope, $g$, which passes over a supporting-pulley above (not shown) and extends to easy reach from below.

The operation of my fork is as follows: The clutch-hooks are opened or spread apart by hand, as indicated in dotted lines, and the central prong, H, is then forced down through the bundle of hay or grain and the hooks closed upon the load, the central prong serving to steady the fork in case the load should be heavier upon one side than it is upon the other. The loop of the inner rope, D, is now caught by the hook-shaped catch $e$, and the end of this catch is retained by the ring-shaped trigger $f$. The fork and its load is now raised by its supporting-rope G, and by means of the carriage and track-rope (not shown) is in the usual way transported to the place where the load is to be dumped. When this point is reached, the trip-rope $g$ is pulled and the trigger $f$ is removed from the top of the hook-shaped catch $e$, which latter falls and releases tension upon the inner rope, D. The effect of this is to shift the point of support of the clutch-hooks farther outward, and the hooks yielding to the pressure of the load separate and drop the load.

Instead of using only a pair of clutch-hooks on each side, a series of tines may be fixed in the cross-bars B to increase the capacity of the hook. One of such tines is shown at A'.

Having thus described my invention, what I claim as new is—

1. The fork herein described, consisting of a cross-head with clutch-hooks pivoted to each end, a trip-block above provided with a hook-catch and trigger with trigger-rope, an inner rope extending from the lower portion of the clutch-hook through the cross-head and adapted to be caught by the hook-catch, and an outer rope extending through the cross-head from the trip-block to the lower portions of the clutch-hooks, substantially as and for the purpose described.

2. The combination of the clutch-hooks A A, with cross-bars B, cross-head C, with prong H and pulleys $b\ b$ and $c\ c$, the trip-block F, with hook-catch $e$ and trigger $f$, the outer rope, E, extending from the lower part of the clutch-hooks to the trip-block, and the inner rope, D, extending from the lower part of the clutch-hooks through the cross-head and adapted to be caught by the hook-catch on the trip-block, substantially as and for the purpose described.

WILLIAM H. LANDER.

Witnesses:
W. E. CREWS,
H. J. BEAN.